Figure 1:
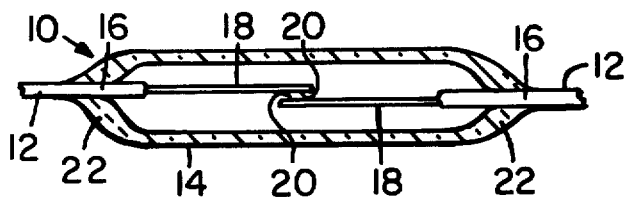

United States Patent [19]
Morgan

[11] 3,949,335
[45] Apr. 6, 1976

[54] REED SWITCH CONSTRUCTION
[75] Inventor: David W. Morgan, Corning, N.Y.
[73] Assignee: Corning Glass Works, Corning, N.Y.
[22] Filed: Apr. 21, 1975
[21] Appl. No.: 569,861

[52] U.S. Cl. .................. 335/154; 106/52; 106/54; 313/221
[51] Int. Cl.² .... C03C 3/08; E05C 7/06; H01H 1/66
[58] Field of Search ............. 106/52, 54; 313/221; 335/154

[56] References Cited
UNITED STATES PATENTS
| | | | |
|---|---|---|---|
| 3,808,154 | 4/1974 | Omori | 106/52 X |
| 3,814,612 | 6/1974 | Inouye et al. | 106/52 |

OTHER PUBLICATIONS

Volf, M. B. — *Technical Glasses* — Pub. London (1961), pp. 330–331.

*Primary Examiner*—Helen M. McCarthy
*Attorney, Agent, or Firm*—Milton M. Peterson; Clinton S. Janes, Jr.; Clarence R. Patty, Jr.

[57] ABSTRACT

A reed switch construction is described embodying magnetic metal reeds and an improved glass envelope. The envelope is drawn from an infrared absorbing glass having a steep viscosity curve which permits forming a seal between the metal reeds and the glass envelope with infrared heating at a temperature sufficiently low to avoid damaging the reeds.

5 Claims, 3 Drawing Figures

3,949,335

REED SWITCH CONSTRUCTION

BACKGROUND OF THE INVENTION

A reed switch is a magnetically controlled switch that automatically makes, breaks, or holds contact in an electrical circuit. Such switches are widely used for electrical circuit control, particularly in the communications field.

The conventional form of dry reed switch includes two magnetic metal reeds which have overlapping, flat, end portions separated by a small gap when the switch is open. The reeds are hermetically sealed in opposite ends of a tubular glass envelope filled with an inert atmosphere. When a magnetic field is applied to such a switch, the flat, overlapping portions of the reeds are attached to each other, thus closing the switch and conducting an electric current. The stiffness of the reeds causes them to separate, and open the circuit, upon removal of the magnetic field. Good electrical contact is assured by plating a thin layer of precious metal over the flat contact portions of the reeds.

In production, a metal reed is inserted in each end of a glass tube and the end of the tube thermally softened to collapse about and seal to a shank portion on the reed. This sealing operation has been greatly facilitated by drawing the tubular enclosure from an infrared absorbing glass, and using an infrared heat source to concentrate heat in a small sealing zone on the glass tube.

The procedures and materials heretofore used in infrared sealing practices have proven quite satisfactory for many purposes. Recently, however, difficulties were encountered in attempts to develop a miniaturized reed switch. The proximity of the glass-metal seal areas to the gold plated contact surfaces of the reeds, and the high temperature necessary for sealing, caused the gold coating on the reeds to blister. Thus, it became highly desirable to provide a glass envelope that could be sealed at a lower temperature while still retaining the other necessary characteristics of a reed switch glass, namely high electrical resistivity, resistance to devitrification and a reasonably high degree of chemical durability. Recent emphasis on avoiding air pollution made it further desirable to produce the envelope from a glass which omitted the well-known, volatile glassmaking materials, lead oxide and fluorides, from its composition.

PRIOR ART

U.S. Pat. No. 3,814,612, granted June 4, 1974 to K. Inoue et al. describes a reed switch embodying a glass envelope and magnetic metal alloy reeds composed of 73 to 93% cobalt, 1 to 5% nickel, and the balance iron. The glass employed in constructing the switch are described as being resistant to devitrification, having coefficients of thermal expansion in the range of 110 to $130 \times 10^{-7}/°C$. ($0°-300°C$.), and being composed essentially of $SiO_2$, $Al_2O_3$, BaO, $Na_2O$, $K_2O$ and FeO.

The practice of using infrared energy to produce the glass-metal seals in a reed switch is described in detail in U.S. Pat. No. 3,660,064 granted May 2, 1972 to T. L. Rohde. This patent is particularly concerned with the arrangement of equipment in carrying out such a sealing operation. Glasses especially adapted to use in radiant sealing techniques are described for example in U.S. Pat. Nos. 3,445,256 granted May 20, 1969 to R. H. Dalton, 3,672,919 granted June 27, 1972 to W. Sack, and 3,698,921 granted Oct. 17, 1972 to C. M. LaGrouw et al.

$R_2O$—BaO—ZnO—$B_2O_3$—$SiO_2$ glasses are well known in the optical glass art as illustrated by U.S. Pat. No. 2,433,883 granted Jan. 6, 1948 to W. H. Armistead.

THE INVENTION

I have now found that the prior problems can be alleviated, and the purposes of the invention thus achieved, by a reed switch construction embodying reeds composed of a magnetic, cobalt-iron-vanadium alloy having a thermal coefficient of expansion within the range of $95-105 \times 10^{-7}/°C$. ($25°-300°C$.), and a tubular glass envelope having an expansion coefficient matching that of the alloy below the glass setting point and being hermetically sealed to the reeds, the envelope being drawn from a glass having a working temperature below 950°C. and being composed essentially of, in percent by weight as calculated from the glass batch on an oxide basis, 46–54% $SiO_2$, 2–8% $B_2O_3$, 0–4% $Li_2O$, 0–12% $Na_2O$, 0–10% $K_2O$, the total content of $Li_2O$ + $Na_2O$ + $K_2O$ being 8–13%, 0–6% CaO, 13–20% BaO, 5–10% ZnO, the total content of CaO + BaO + ZnO being 25–35%, 0–2% $TiO_2$, 0–4% $ZrO_2$, and 0.5–5.0% $Fe_2O_3$.

DRAWING

Figure 2:
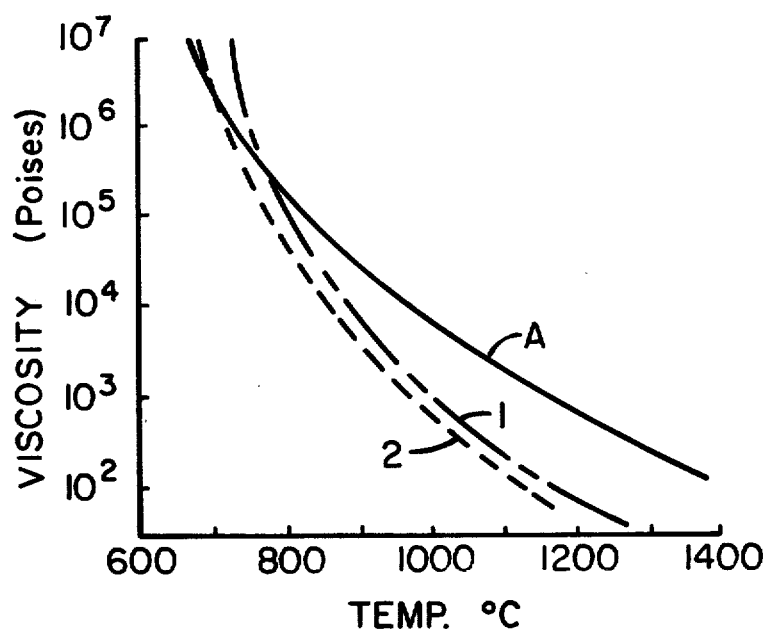
Figure 3:
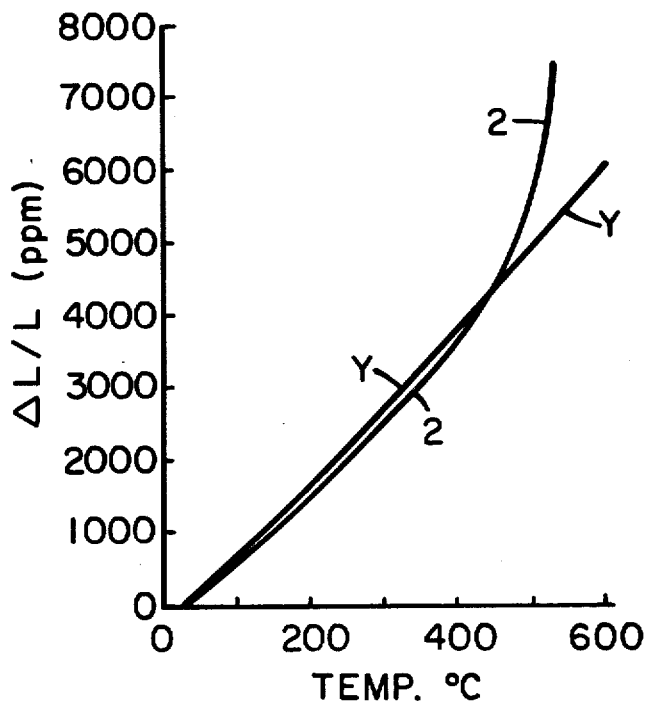

The invention is further described with reference to the accompanying drawing wherein, FIG. 1 is a schematic cross sectional view of a reed switch in accordance with the invention, FIG. 2 is a graphical illustration comparing the viscosity-temperature curve of a prior glass with those of glasses of the present invention, and FIG. 3 is a graphical illustration comparing the thermal expansion characteristics of an alloy and a glass adapted for use in accordance with the present invention.

GENERAL DESCRIPTION

FIG. 1 illustrates, in simple schematic form, a reed switch 10 consisting of two elongated metal reeds 12 hermetically sealed within opposite ends of tubular glass envelope 14. Each of reeds 12 has a shank portion 16 encased within, and hermetically sealed to, a collapsed end portion 22 of tube 14. Reeds 12 also have generally flat, contacting strips 18 which are enclosed within tube 14 and overlap one another. Contact strips 18 are provided on their opposed contact surfaces with a noble metal coating 20 such as gold or silver. The present invention is particularly concerned with such a reed switch construction embodying an improved glass tube 14.

Metal reeds 12 must of a magnetic material to be operative. Particularly desirable materials are the cobalt-iron alloys of the so-called Remendeur series that contain a small amount of vanadium and have thermal expansion coefficients in the range of 95 to $105 \times 10^{-7}/°C$. ($25°-300°C$.), and slightly higher over higher temperature ranges. One such alloy, Remendeur 38, reportedly contains about 4% vanadium and the remainder substantially equal parts of cobalt and iron. This alloy has thermal expansion characteristics as shown in FIG. 3 of the attached drawing with average coefficient in the range $25°-300°C$. being about $98 \times 10^{-7}/°C$. Glasses suitable for sealing thereto must have a matching average coefficient below the glass setting temperature as explained hereafter.

The matter of expansion match is complicated somewhat by the fact that glasses and alloys generally do not have corresponding types of expansion curves. Thus, the cobalt-iron alloys have a relatively constant expansion of coefficient, as indicated by an essentially straight line type curve when the thermal expansion coefficient is plotted against temperature. The present glasses have a typical hook type curve caused by the expansion coefficient increasing more rapidly at higher temperatures. This is illustrated in FIG. 3 wherein thermal expansion ($\Delta L/L$) in parts per million is plotted along the vertical axis, and temperature, in degrees Centigrade, is plotted along the horizontal axis. The straight line curve Y represents the expansion curve for the specific cobalt-iron alloy mentioned earlier, and curve 2 is the expansion curve for the glass of Example 2 in Table I, infra.

It is customary to report expansion coefficient as an average value between zero and 300°C. (0°–300°C.) or between 25° and 300°C. (25°–300°C.). However, in glassmetal seals, the significant temperature range is between 25°C. and the glass setting temperature, a temperature customarily taken as 5°C. above the glass strain point. Thus, the requirement for a strain-free seal is that the curves match at the setting temperature of the glass, that is, about 500°C. However, with reference to the alloys, the coefficient varies only by a small amount over this temperature range, and should be in the range of $95-110 \times 10^{-7}/°C$. To match these alloys, the glasses should have a strain point in the range of 470°–510°C. and a coefficient of thermal expansion of $80-90 \times 10^{-7}/°C$. over the temperature range of 25°C. to 300°C. (25°–300°C.).

As explained earlier, it is a particular purpose of the present invention to produce glass tube 14 from a glass having a lower viscosity at the sealing temperature than the prior glasses used for this purpose. The sealing temperature may vary somewhat depending on the particular glass and the particular construction involved, but the working temperature of the glass is customarily taken as a reference temperature for this purpose. The working temperature is generally considered to be the temperature at which the glass viscosity is equal to approximately $10^4$ poises. For present purposes, a working temperature below 950°C., and preferably in the range 850°–900°C., is desired.

It is known that an increase in the alkali metal oxide ($Na_2O$, $K_2O$ and/or $Li_2O$) content of a glass tends to lower the glass viscosity. However, this well-known expedient is of little value in the present instance because the alkali metal oxides tend to uniformly depress the entire viscosity-temperature curve, rather than to move it clockwise about a point in a manner such that the curve becomes steeper. Also, increased contents of these oxides tend to increase the thermal coefficient of expansion and decrease electrical resistivity. Hence, the alkali metal oxides must be limited as indicated, and their total content should be in the range of 8 to 13% by weight. In general, a mixed alkali glass, that is one containing at least two of the three common alkali metal oxides, provides better electrical resistivity characteristics. A preferred glass for present purposes contains both potash ($K_2O$) and lithia ($Li_2O$), and optionally a small amount of soda ($Na_2O$).

A particular feature of the present glasses is a large, selective divalent metal oxide content that is at least twice the alkali metal oxide content. The combination of BaO and ZnO, within the indicated ranges, tends to steepen the viscosity-temperature curve of a glass as well as minimize the glass liquidus. This latter characteristic renders the glass more resistant to devitrification, and hence more flexible in flame working and sealing. However, amounts of either BaO or ZnO, or total divalent metal oxide content, in excess of those indicated tend to render the glass difficult to melt and also raise the glass liquidus. CaO may be useful in small amounts to maintain a low liquidus, but should not exceed 6% if present.

At least 0.5% iron oxide is necessary to provide a minimum degree of infrared absorption in the glass, thereby enabling use of the infrared sealing technique. While the glass may contain up to 5% iron oxide, it is preferable to employ this oxide in the range of 2–4%. The iron oxide content of the present glasses is reported as $Fe_2O_3$ for convenience. However, it will be understood that it must be predominantly in the reduced ferrous state (FeO) to provide infrared absorption for sealing. To this end, it is preferred to add the iron as ferrous oxalate. In addition, a small amount of tin may be present as a mild reducing agent. Stronger reducing agents, such as metal powders and carbonaceous materials, may be used, but entail the danger of excessive reduction.

The oxides of titanium and zirconium are not required, but are particularly useful in maintaining good chemical durability in the glass. Accordingly, it is desirable to have at least one of these oxides present, and preferably both, with the total content however not exceeding about 6% by weight.

Another feature of the present glasses is the presence of a small, but significant, amount of boric oxide ($B_2O_3$). It has been found that this oxide tends to steepen the viscosity curve when used in the amounts indicated. Large amounts of alumina are undesirable, although amounts up to about 3% may be present and, in substitution for silica, tend to lower the glass liquidus somewhat. In general, other oxides are not necessary in the present glasses, but it is contemplated that known glassmaking oxides, such as fining agents, colorants, and divalent oxides other than those specifically recited, may be present in limited amounts for known purposes.

Where volatizilation control during melting is a factor in pollution control, the well-known glass softening agents, lead oxide and the halides, particularly the fluroides, are avoided. Otherwise, small amounts of either may be beneficial in lowering melting and sealing temperatures.

The invention is further illustrated by comparing a prior commercial reed switch glass, designated A, with three glasses in accordance with the present invention. Table I shows the glass compositions in percent by weight, as calculated on an oxide basis from the glass batch; glass A being a typical lead glass composition and glasses 1, 2 and 3 being $R_2O-RO-SiO_2$ glasses free of lead oxide and halides. The Table further includes relevant properties for each glass including softening point (Soft.Pt.), annealing point (Ann.Pt.), strain point (Str.Pt.), average coefficient of thermal expansion $\times 10^{-7}$ between 0° and 300°C. (Exp.), log of resistivity at 350°C. (Log R.), infrared transmission at 1.12 microns through 1.0 mm. thick glass (I.R.), and liquidus (Liq.) after 72 hours heating. All temperatures are in degrees centigrade (°C.).

TABLE I

|  | A | 1 | 2 | 3 |
|---|---|---|---|---|
| $SiO_2$ | 52.6 | 49.3 | 48.9 | 49.7 |
| $Al_2O_3$ | 1.5 | — | — | — |
| $B_2O_3$ | — | 4.0 | 4.1 | 4.1 |
| $Li_2O$ | — | — | 2.3 | 2.2 |
| $Na_2O$ | 3.7 | 10.0 | 1.8 | 1.4 |
| $K_2O$ | 9.1 | — | 7.3 | 7.0 |
| CaO | — | 5.0 | 5.6 | 5.6 |
| BaO | — | 17.0 | 15.3 | 15.3 |
| ZnO | — | 8.2 | 8.1 | 8.1 |
| PbO | 27.8 | — | — | — |
| $TiO_2$ | — | 1.0 | 1.0 | 1.0 |
| $ZrO_2$ | — | 3.0 | 3.1 | 3.1 |
| $Fe_2O_3$ | 5.0 | 2.5 | 2.5 | 2.5 |
| $As_2O_3$ | 0.3 | — | — | — |
| Soft.Pt. | 627 | 676 | 642 | 642 |
| Ann.Pt. | 445 | 535 | 502 | 502 |
| Str.Pt. | 405 | 502 | 472 | 472 |
| Exp. | 91.5 | 90.1 | 88.6 | 84.0 |
| Log R. | 7.7 | 7.1 | 8.8 | 8.8 |
| I.R. (%) | — | 3.0 | 3.5 | — |
| Liq. | <900 | 915 | 810 | — |

The glasses of Examples 2 and 3 illustrate how alkali metal oxides and silica may be adjusted to provide a particular expansion coefficient for sealing. The glass of Example 3 is particularly desirable for use with the magnetic alloy mentioned earlier. Allowing the normal tolerances for adjustment of melting and sealing conditions this preferred glass will consist of 48–51% $SiO_2$, 4–5% $B_2O_3$, 1 ½–3%, $Li_2O$, 1–2% $Na_2O$, 6–8% $K_2O$, 5–6% CaO, 14–17% BaO, 7–9% ZnO, 3–5% $TiO_2$ + $ZrO_2$ and 2–4% $Fe_2O_3$.

The curves in FIG. 2 of the drawing provide a graphical representation of the viscosity-temperature characteristics for glasses A, 1 and 2 of Table I. The curve for glass 3 is not shown, since it is essentially the same as that of glass 2. In the representation, viscosity in poises is plotted on the vertical axis, whereas temperature, in °C., is plotted along the horizontal axis. It will be observed that the standard low temperature viscosity characteristics, that is softening, strain and annealing points, are now shown in the graph, but rather are given numerically in the Table.

Referring then to both the Table and the graph, it will be observed that, at the strain point where the viscosity is $10^{13.4}$ poises, the temperature of the new glasses is 70°–100°C. higher than that of the prior glass. The three glasses essentially coincide. hat is their curves cross, in the 700°–800°C. range. At the working temperature, corresponding to $10^4$ poises, the new glasses are 70°–100°C. lower than the prior glass. The effect of the steeper viscosity curve then is to provide a temperature interval from the strain point to the working temperature that is 150° to 200°C. shorter than with the prior glass. The practical effect is to reduce the sealing temperature by a sufficient amount to avoid the gold blistering effect encountered earlier at contact faces 20. Also, it is apparent that glass melting temperatures are on the order of 200°C. lower.

It will be noted that the temperature interval between the working temperature and the strain point for glasses 1 and 2 is approximately 400°C., whereas the same interval for glass A is about 550°C. In general, it is preferred that this interval not substantially exceed the 400°C. value illustrated.

The effect of varying divalent metal oxide content on expansion coefficient is illustrated in Table II below. Also illustrated is the effect of such variations on liquidus temperature, a critical factor in glass working and sealing. The three glasses of Table II are identical on a mole % basis except that, with reference to glass 4, three mole percent (3%) CaO has been replaced by 3% BaO in glass 5, and three mole percent (3%) ZnO has been replaced by three mole percent BaO in glass 6. However, the compositions are given in weight percent for purposes of reference to the claimed ranges.

TABLE II

|  | 4 | 5 | 6 |
|---|---|---|---|
| $SiO_2$ | 51.7 | 49.3 | 49.9 |
| $B_2O_3$ | 4.1 | 4.0 | 4.0 |
| $Li_2O$ | 2.2 | 2.0 | 2.1 |
| $Na_2O$ | 1.6 | 1.5 | 1.5 |
| $K_2O$ | 6.8 | 6.5 | 6.6 |
| CaO | 6.7 | 3.6 | 6.4 |
| BaO | 10.4 | 17.4 | 17.6 |
| ZnO | 9.7 | 9.2 | 5.3 |
| $ZrO_2$ | 3.1 | 3.0 | 3.0 |
| $TiO_2$ | 1.0 | 1.0 | 1.0 |
| $Fe_2O_3$ | 2.7 | 2.6 | 2.6 |
| Soft.Pt. | 660 | 663 | 663 |
| Ann.Pt. | 511 | 511 | 514 |
| Str.Pt. | 478 | 477 | 480 |
| Exp. | 81.8 | 83.6 | 86.6 |
| Liq. |  |  |  |
| (24 hrs.) | 864 | 676 | 833 |
| (72 hrs.) | 887 | <800 | 871 |

It is apparent that the substitutions of BaO for CaO and ZnO raise the thermal coefficient of expansion markedly without altering viscosity characteristics appreciably. It is also apparent that the bivalent oxide content is quite critical with respect to liquidus temperatures. Thus, glasses containing the bivalent oxides within indicated limits tend to have low liquidus values as illustrated by Example 5. Examples 4 and 6 illustrate the effect of even a small excess of CaO.

I claim:

1. A reed switch embodying reeds composed of a magnetic, cobalt-iron-vanadium alloy having a thermal coefficient of expansion within the range of 95–105 × $10^{-7}$ (25°–300°C.), and a tubular glass envelope having an expansion coefficient matching that of the alloy below the glass setting point and being hermetically sealed to the reeds, the envelope being drawn from a glass having a working temperature below 950°C. and being composed essentially of, in percent by weight as calculated from the glass batch on an oxide bases, 46–54% $SiO_2$, 2–8% $B_2O_3$, 0–4% $Li_2O$, 0–12% $Na_2O$, 0–10% $K_2O$, the total content of $Li_2O + Na_2O + K_2O$ being 8–13%, 0–6% CaO, 13–20% BaO, 5–10% ZnO, the total content of CaO + BaO + ZnO being 25–35%, 0–2% $TiO_2$, 0–4% $ZrO_2$, and 0.5–5.0% $Fe_2O_3$.

2. A reed switch in accordance with claim 1 wherein the reeds are composed of an alloy containing substantially equal parts of cobalt and iron and about 4% vanadium and the glass sealed thereto has a strain point of 470°–510°C. and a coefficient of thermal expansion in the range of 80–90 × $10^{-7}$/°C. (0°–300°C.).

3. A reed switch in accordance with claim 2 wherein the glass consists of 48–50% $SiO_2$, 4–5% $B_2O_3$, 2–3% $Li_2O$, 1–3% $Na_2O$, 6–9% $K_2O$, 5–6% CaO, 14–17% BaO, 7–9% ZnO, 3–5% $TiO_2$ + $ZrO_2$ and 2–4% $Fe_2O_3$.

4. A reed switch in accordance with claim 1 wherein the glass working temperature is in the range of 850°C. to 900°C.

5. A reed switch in accordance with claim 4 wherein the temperature interval between the working temperature and the strain point of the glass is not over about 400°C.

* * * * *